United States Patent [19]

Meyers

[11] Patent Number: 4,485,874
[45] Date of Patent: Dec. 4, 1984

[54] METHOD FOR SCALE REMOVAL AND SCALE INHIBITION IN A WELL PENETRATING A SUBTERRANEAN FORMATION

[75] Inventor: Kevin O. Meyers, Plano, Tex.

[73] Assignee: Atlantic Richfield Company, Los Angeles, Calif.

[21] Appl. No.: 542,249

[22] Filed: Oct. 14, 1983

[51] Int. Cl.³ .................... E21B 43/27; E21B 43/28
[52] U.S. Cl. ............................ 166/279; 166/244 C; 166/307; 166/312; 252/8.55 B
[58] Field of Search ............... 166/244 C, 271, 273, 166/279, 307, 310, 312, 371; 252/8.55 B, 8.55 C, 8.55 E

[56] References Cited

U.S. PATENT DOCUMENTS

| | | | |
|---|---|---|---|
| 3,481,400 | 12/1969 | Kerver et al. | 166/312 X |
| 3,482,636 | 12/1969 | Crowe | 166/312 X |
| 3,483,925 | 12/1969 | Slyker | 166/310 X |
| 3,633,672 | 1/1972 | Smith et al. | 166/279 |
| 3,688,829 | 9/1972 | Jones | 166/307 X |
| 3,913,678 | 10/1975 | Blount et al. | 166/244 C X |

Primary Examiner—George A. Suchfield
Attorney, Agent, or Firm—F. Lindsey Scott

[57] ABSTRACT

Step declines in the production rate from a well following an acid treatment, and a scale inhibitor treatment are reversed by use of an EDTA treatment.

11 Claims, 1 Drawing Figure

U.S. Patent   Dec. 4, 1984   4,485,874
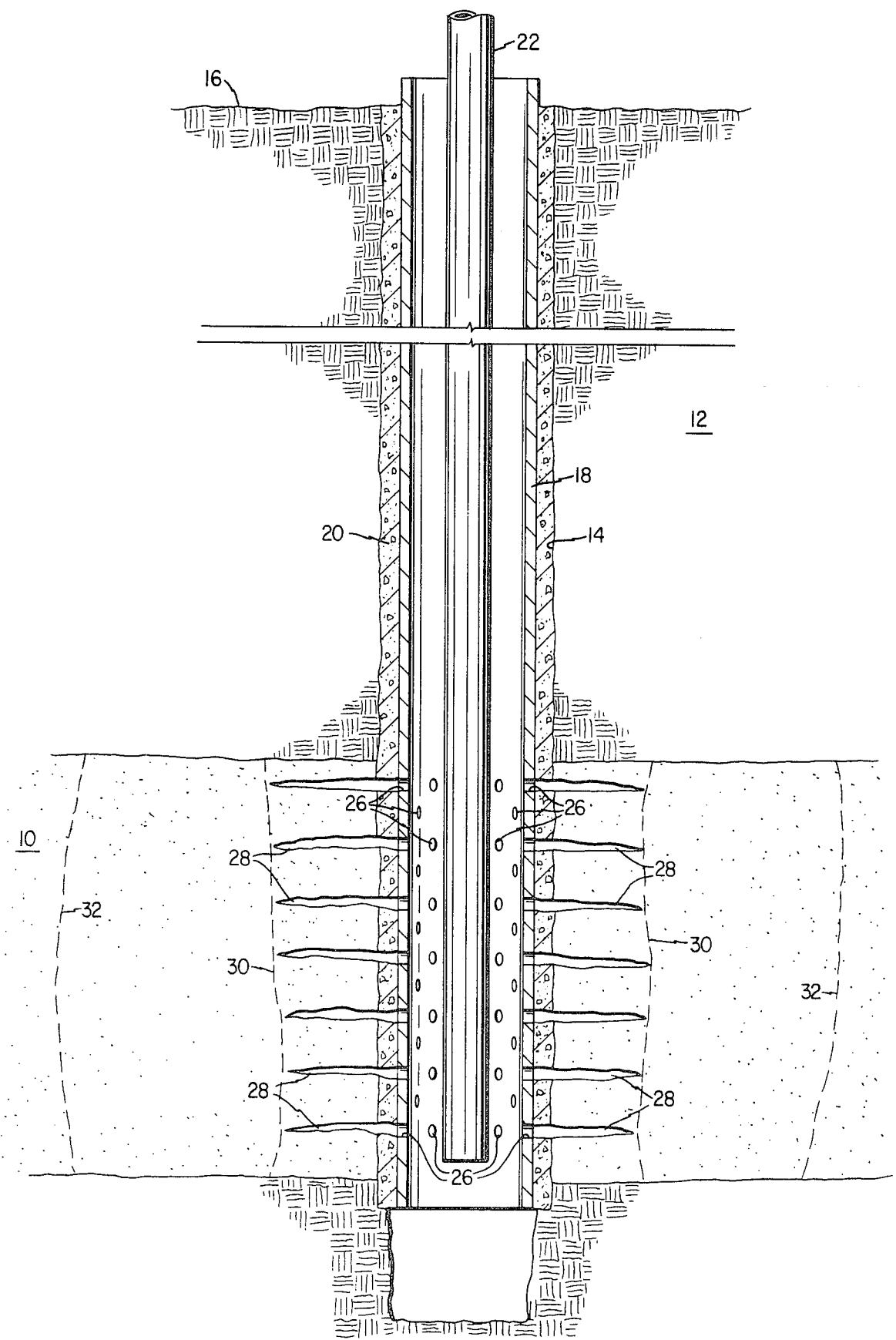

METHOD FOR SCALE REMOVAL AND SCALE INHIBITION IN A WELL PENETRATING A SUBTERRANEAN FORMATION

This invention relates to the removal of precipitates of multi-valent cations and scale inhibitor compounds.

In the production of fluids from subterranean formations through a well penetrating the formation, it is necessary that the well and the formation around the well be kept free of materials which would plug either the formation or the well. Some such plugging materials may comprise drilling fluids, cement filtrates and the like used during the drilling and completion of the well. Methods are well known to the art for preventing the entry of these materials into the formation or recovering them from the formation or both so that the formation is not plugged.

After completion of the well and the initiation of the production of fluids from the well plugging or partial plugging of the well, perforations through the well casing or the formation can result from the formation of scale as fluids are produced from the formation. Such scale formation can occur as a result of incompatible fluids in the well, i.e., fluids which when mixed produce precipitates, or from the formation fluids during production. Since the use of incompatible fluids can usually be avoided, the problem of greatest concern is the formation of precipitates from the formation fluids during production. One precipitate which is frequently encountered as scale is calcium carbonate.

Calcium carbonate is readily formed in such environments by reactions such as

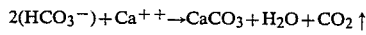

$$2(HCO_3^-) + Ca^{++} \rightarrow CaCO_3 + H_2O + CO_2 \uparrow$$

Such reactions are favored by reductions in the pressure on the formation fluids. Accordingly, in formation fluids which contain soluble carbonates and/or bicarbonates and calcium or other multivalent cations such as magnesium, barium, iron and the like which form relatively insoluble carbonate compounds, precipitates tend to form at the point at which the pressure in the formation fluids is reduced. Such points tend to be in the formation adjacent the well or in perforations in the well casing. In either instance the production of fluids from the formation is restricted as such scale forms.

In the production of fluids from formations which are susceptible to such scale formation, the production of fluids from such wells tends to decline steadily as the scale forms. To restore the production rates from such wells, various methods have been used.

Such wells can be re-perforated by opening new perforations through the well casings and exposing new formation surfaces. Such methods can be used to restore production rates, but are subject to plugging by the formation of additional scale. These methods are relatively expensive and are of limited value in formations where rapid scale formation occurs.

Acid treatments have been used effectively for the removal of such scale. While the use of acid treatments is effective in many instances it does require the removal of the well from production for the acid treatment process which is disadvantageous especially if the formation is subject to rapid scale formation. Further, the production rate begins to decline after the treatment as more scale is formed so that during much of its producing life the well is producing fluids at a reduced rate.

EDTA, ethylenediamine tetraacetic acid salts have been used to remove such scale. The EDTA is generally used in aqueous solution to contact the zone of interest to dissolve such scale. The process is similar to that used with acid treatments and suffers many of the same disadvantages.

To overcome the disadvantages of reduced production rates scale inhibitors have been used. Such scale inhibitors are known to the art as discussed in water-formed *Scale Deposits,* Jack C. Cowan and Donald J. Weintritt, Gulf Publishing Company, Houston, Tex. 1976, Chapter 7, "Scale and Deposit Prevention and Control", which is hereby incorporated in its entirety by reference. Scale inhibitors such as phosphate esters, polyacrylamides and phosphonic acid derivatives have been used for such purposes. Such scale inhibitors may be used by: (a) acid cleaning the well, well perforations and the formation surrounding the well, (b) removing the cleaning fluids and (c) injecting the scale inhibitor into the formation. The scale inhibitor is then retained in the formation and released slowly with the produced fluids. The presence of small amounts of scale inhibitor in the produced brine (less than 50 ppm) is effective to inhibit the formation of scale in the well, well perforations and and in the formation surrounding the well.

In some instances it has been found that a step decline in production rates from such wells occurred immediately after the scale inhibitor treatment. The step decline is typically followed by a long period of stable production rates. Since this step decline in production rates is undesirable, but the stable production rates resulting from the use of scale inhibitors is desirable, a continuing effort has been directed to the development of a method by which such losses in the production rate can be avoided when scale inhibitors are used.

It has now been found that such step declines can be reversed and the initial production rates after well cleaning with acid restored by an improvement comprising: treating the well with EDTA.

The FIGURE is a schematic diagram of a cased well penetrating a subterranean formation.

In the FIGURE a subterranean formation 10 is shown beneath an overburden 12. A wellbore 14 penetrates formation 10 from the surface 16. Wellbore 14 includes a casing 18 cemented in place by cement 20 from surface 16 through formation 10. Wellbore 14 as shown has been completed to a depth greater than the bottom of formation 10, but has not been cased to its full depth. Casing 18 has been perforated in the zone of formation 10 by a plurality of perforations 26 which extend through casing 18 and cement 20 and via extensions 28 into formation 10. Such perforations permit the flow of formation fluids into casing 18. A tubing 22 is positioned in casing 18.

In practice, after wellbore 14 has been drilled and completed as shown, production occurs from formation 10 by the flow of fluids through perforations 26 into the wellbore with the fluids then being recovered through casing 22 if the formation pressure is sufficient. A variety of other well-known techniques can be used for the recovery of fluids from such formations such as pumping, gas lift, and the like. Further, in some instances, the casing may not extend through formation 10 but rather gravel packs, screens and the like may be used or the formation may be produced open hole, etc., as known to the art. The present invention is effective with such variations. In the production of fluids from formation 10 in many instances scale tends to be deposited in zones where the formation pressure is reduced as the fluids flow into the wellbore. Such zones typically are the perforations 26 or the formation in an area 30 adjacent the wellbore. Since these are zones of flow constriction the formation of scale in these zones results in a reduction in the production of fluid from formation 10. As discussed, such deposits, in many instances, can be removed by mineral acid treatments. The acid treatment can be accomplished by pumping a material which is desirably immiscible with the acid through tubing 22 and into the annulus of casing 18 and thereafter pumping a quantity of acid through tubing 22 into the vicinity of perforations 26. The mineral acid is used as an aqueous solution in an amount effective to remove scale from the well casing 18, casing perforation 26 and the portions of formation 10 to be contacted; and, is maintained in contact with the well casing 18, casing perforations 26 and the contacted portions of formation 10 for an effective time to remove the scale. Contact times from about 0 (i.e., the acid is pumped into and immediately produced from the well) to about 8 hours are typical. The acid is normally removed from the well by the resumption of production of fluids from the well. In many instances, such mineral acid solutions comprise aqueous solutions of hydrochloric acid or nitric acid with hydrochloric acid being greatly preferred. The solution may also contain a corrosion inhibitor to prevent reaction of the acid with the casing, tubing, and other metallic components of the well. Typical acid concentrations are from about to about 5 to about 28% acid in aqueous solution. The use of such acid treatments is well known to those skilled in the art. In many instances, the acid treatment is used to treat the wellbore and the perforations and zone 30 adjacent wellbore 14 and is controlled to avoid pushing any substantial amount of the acid into the formation. In other instances, it may be desirable to treat the formation with the acid and if such is the case, then pressure is used to force the acid into the formation. If the well is not cased through the zone of interest the formation is similarly treated.

When EDTA treatments are used, a similar procedure is followed.

When scale inhibitors are used, the scale inhibitor is pumped into the formation a substantial distance shown as zone 32 in the FIGURE. The scale inhibitor is at least partially retained in the formation and slowly released into the produced fluids as production of fluids from the formation occurs. Scale inhibitors are not effective to remove scale, but are effective to prevent future scale formation.

In some instances, it has been observed that after an acid treatment, followed by a suitable interval of production to remove acidic components from the formation and wellbore, upon completion of a scale inhibitor injection, a step decline in the production rate of the well occurs immediately with the production rate falling to a lower rate than the production rate after acidizing which is then relatively stable at the lower production rate over relatively long periods of time. While the stable production rate is highly desirable, it is undesirable that the stable rate be at the lower level.

It has now been found that much of the step decline can be reversed by the use of a EDTA contacting step. The EDTA is placed in contact with perforations 26 and/or formation 10 as a aqueous solution by a process similar to that used for the acid treatment. The EDTA is injected as an aqueous solution in an amount and for a time effective to dissolve precipitates of multivalent cations and scale inhibitor. Typical EDTA concentrations are from about 0.1 to about 0.8 pounds per gallon of solution and typically contact times will vary from about 0 (i.e., the EDTA is pumped into and immediately produced from the well) to about 8 hours. The volume of solution used will vary widely based upon the thickness of formation 10 and other factors known to the art. Volumes from about 5 to about 20 gallons per foot of perforated zone or production zone are typical. Larger volumes are required if the EDTA is to fill zone 32 or the like. EDTA has been found to restore the step decline in production rates.

Various scale inhibitors are know to those skilled in the art, such as phosphate esters, polyacrylamides, phosphonic acid derivatives and the like.

While applicant does not wish to be bound by any particular theory, it appears that when scale inhibitors are used, these materials tend to precipitate in the presence of multi-valent cations such as calcium, magnesium, barium, iron and the like. These precipitates of multi-valent cations and scale inhibitor are relatively insoluble in the formation environment and are also relatively insoluble in acids. As a result, such materials are not removed by acid treatments and are very slowly removed by the continued production of fluids from the formation. It has now been found that the use of EDTA is effective to remove these precipitates. It is believed that the EDTA operates to remove these precipitates by reaction with the multi-valent cations thereby removing them from the precipitates, thus restoring the solubility of the scale inhibitors. In any event the use of EDTA has been found to be extremely effective in restoring the productivity rates in such wells.

The precipitates may occur at substantial distances from the wellbore since the scale inhibitor is injected a substantial distance into the wellbore as shown by zone 32 in the FIGURE. It may be necessary in some instances if plugging occurs in the formation, to use EDTA injection into the formation to remove the precipitates. The formation of precipitates in the formation may not be a problem if the formation is not plugged since the presence of these materials in the formation for very slow release is not undesirable. If however, plugging occurs, the use of EDTA injection to substantially the same distance as the scale inhibitor can be used to remove the precipitates. In most instances it is believed contacting with EDTA will be by substantially the same procedure used for the acid wash since the precipitates normally constitute a problem in the perforations and/or zone 30 adjacent the wellbore.

Having thus described the invention by reference to of its preferred embodiments, it is noted that the embodiments described are illustrative rather than limiting in nature and that many variations and modifications are possible within the scope of the present invention. Many such variations and modifications may be considered obvious and desirable by those skilled in the art upon a review of the foregoing description of preferred embodiments.

I claim:

1. In a method for removing scale and inhibiting the formation of scale in a well penetrating a subterranean formation for the production of fluids from said formation, said method including; cleaning said well by injecting an aqueous solution of a suitable mineral acid into said well in an amount and for a time effective to remove scale from said well and thereafter injecting a scale inhibitor into said formation about said well through said well so that said scale inhibitor is thereafter slowly released from said formation to inhibit the formation of scale, an improvement comprising: injecting an aqueous solution of a chelating agent into said well in an amount and for a time effective to remove precipitates of multi-valent cations and said scale inhibitor.

2. The method of claim 1 wherein said scale comprises calcium carbonate.

3. The method of claim 2 wherein said mineral acid is hydrochloric acid.

4. The method of claim 2 wherein said scale inhibitor comprises a phosphonic acid derivative.

5. The method of claim 2 wherein said scale inhibitor comprises a phosphate ester.

6. The method of claim 2 wherein said scale inhibitor comprises polyacrylamides.

7. The method of claim 2 wherein said multi-valent cations comprise ions of calcium, magnesium, barium and iron.

8. The method of claim 2 wherein said chelating agent is EDTA.

9. The method of claim 8 wherein said aqueous solution of said chelating agent is controlled to contact the wellbore, wellbore perforations and said formation about said well into which said scale inhibitor was injected.

10. The method of claim 2 wherein said aqueous solution of said chelating agent is injected after a step decline in the production of fluids from said well.

11. The method of claim 2 wherein said injection of said aqueous solution of said chelating agent is controlled to contact the wellbore, wellbore perforations and portions of said formation near said well.

* * * * *

UNITED STATES PATENT AND TRADEMARK OFFICE
CERTIFICATE OF CORRECTION

PATENT NO. : 4,485,874

DATED : 12/4/84

INVENTOR(S) : Kevin O. Meyers

It is certified that error appears in the above-identified patent and that said Letters Patent is hereby corrected as shown below:

In column 2, lines 9 and 10 the words "water-formed" should be capitalized and italicized.

Signed and Sealed this

Eleventh Day of June 1985

[SEAL]

Attest:

DONALD J. QUIGG

Attesting Officer     Acting Commissioner of Patents and Trademarks